(12) United States Patent
Shirao et al.

(10) Patent No.: US 12,428,115 B2
(45) Date of Patent: Sep. 30, 2025

(54) AUTOMATIC MANEUVERING SYSTEM, WATERCRAFT CONTROL DEVICE, WATERCRAFT CONTROL METHOD, AND PROGRAM

(71) Applicant: NHK SPRING Co., Ltd., Yokohama (JP)

(72) Inventors: Masato Shirao, Yokohama (JP); Marino Akita, Yokohama (JP); Takafumi Oshima, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 185 days.

(21) Appl. No.: 18/008,829

(22) PCT Filed: Jun. 8, 2021

(86) PCT No.: PCT/JP2021/021710
§ 371 (c)(1),
(2) Date: Dec. 7, 2022

(87) PCT Pub. No.: WO2021/251367
PCT Pub. Date: Dec. 16, 2021

(65) Prior Publication Data
US 2023/0294803 A1 Sep. 21, 2023

(30) Foreign Application Priority Data
Jun. 10, 2020 (JP) .................. 2020-101113

(51) Int. Cl.
*B63C 9/00* (2006.01)
*B63H 21/21* (2006.01)
(Continued)

(52) U.S. Cl.
CPC .......... *B63C 9/0005* (2013.01); *B63H 21/213* (2013.01); *B63H 25/42* (2013.01); *G05D 1/0206* (2013.01); *B63H 2021/216* (2013.01)

(58) Field of Classification Search
CPC .... B63C 9/0005; B63H 21/213; B63H 25/42; B63H 2021/216; B63H 25/04; B63H 25/02; G05D 1/0206; B63B 34/10
See application file for complete search history.

(56) References Cited

U.S. PATENT DOCUMENTS

| | | | | |
|---|---|---|---|---|
| 8,924,054 | B1 * | 12/2014 | Arbuckle | G05D 1/0206 |
| | | | | 701/518 |
| 2003/0089291 | A1 | 5/2003 | Kanno et al. | |
| 2018/0335780 | A1 * | 11/2018 | Stevens | B63C 9/0011 |

FOREIGN PATENT DOCUMENTS

| | | |
|---|---|---|
| JP | S58099198 U | 7/1983 |
| JP | 2003127987 A | 5/2003 |

(Continued)

OTHER PUBLICATIONS

EPO Extended Search Report for corresponding EP Application No. 21822060.6; Issue Date, Nov. 6, 2023.
(Continued)

*Primary Examiner* — Aniss Chad
*Assistant Examiner* — Nikki Marie M Molina
(74) *Attorney, Agent, or Firm* — CANTOR COLBURN LLP (57) ABSTRACT

A watercraft of an automatic maneuvering system includes an actuator configured to generate a propulsive force and a turning moment, an operation unit, and a watercraft control device.

12 Claims, 4 Drawing Sheets

(51) Int. Cl.
*B63H 25/42* (2006.01)
*G05D 1/00* (2024.01)

(56) References Cited

FOREIGN PATENT DOCUMENTS

| JP | 2020019424 A | | 2/2020 | |
|---|---|---|---|---|
| KR | 1020200052535 A | | 5/2020 | |
| WO | 2016144852 A1 | | 9/2016 | |
| WO | WO-2020111040 A1 | * | 6/2020 | ............. B63B 49/00 |

OTHER PUBLICATIONS

International Search Report for International Application No. PCT/JP2021/021710; Date of Mailing, Aug. 17, 2021.
Sera et al., "Influence of the maneuverability in the Williamson turn", Japan Institute of Navigation, The Journal of Japan Institute of Navigation, vol. 133 (2015), pp. 107-112, in the 131st lecture in 2014.

* cited by examiner

AUTOMATIC MANEUVERING SYSTEM, WATERCRAFT CONTROL DEVICE, WATERCRAFT CONTROL METHOD, AND PROGRAM

CROSS REFERENCE TO RELATED APPLICATIONS

This is the U.S. national stage of application No. PCT/JP2021/021710, filed on Jun. 8, 2021. Priority under 35 U.S.C. § 119(a) and 35 U.S.C. § 365(b) is claimed from Japanese Application No. 2020-101113, filed Jun. 10, 2020, the disclosure of which is also incorporated herein by reference.

TECHNICAL FIELD

The present invention relates to an automatic maneuvering system, a watercraft control device, a watercraft control method, and a program.

BACKGROUND ART

In the related art, a personal watercraft (PWC) auto-return system is known (see, for example, Patent Document 1). The PWC auto-return system described in Patent Document 1 includes a user device and an autopilot unit arranged within a PWC. The user device includes a rider location determination unit, a user interface, and a communication unit. In the technology described in Patent Document 1, when a rider carrying the user device is away from the PWC (falls overboard), the PWC receives a request from the user interface and moves to a location of the user device in an automatic maneuvering process.

Meanwhile, a specific control process when the automatic maneuvering process of the PWC is performed is not described in Patent Document 1. Thus, according to the technology described in Patent Document 1, it may be difficult to appropriately perform a control process of automatically returning the PWC to the rider at a location away from the PWC in the automatic maneuvering process.

CITATION LIST

Patent Document 1
United States Patent Application, Publication No. 2018/0335780
Patent Document 2
Japanese Unexamined Patent Application, First Publication No. 2020-019424

SUMMARY OF INVENTION

Technical Problem

In view of the above-described problem, an objective of the present invention is to provide an automatic maneuvering system, a watercraft control device, a watercraft control method, and a program capable of appropriately performing a control process of returning a watercraft toward an occupant at a location away from the watercraft in automatic maneuvering.

Solution to Problem

According to an aspect of the present invention, there is provided an automatic maneuvering system including a watercraft and a communication device, wherein the watercraft includes an actuator having a function of generating a propulsive force of the watercraft and a function of generating a turning moment in the watercraft; an operation unit configured to receive an input operation for operating the actuator; and a watercraft control device configured to operate the actuator on the basis of at least the input operation received by the operation unit, wherein the watercraft control device has a manual maneuvering mode in which the actuator is operated on the basis of the input operation received by the operation unit; and an automatic maneuvering mode in which the actuator is operated on the basis of a distance between the watercraft and the communication device and heading of the watercraft without any need for the operation unit to receive the input operation, and wherein, in the automatic maneuvering mode, the watercraft control device is able to execute first control which controls that a rate of decrease in a distance between the watercraft and the communication device is less than or equal to a first threshold value and second control which controls that the rate of decrease in the distance between the watercraft and the communication device is greater than the first threshold value.

According to an aspect of the present invention, there is provided a watercraft control device provided in a watercraft including an actuator having a function of generating a propulsive force of the watercraft and a function of generating a turning moment in the watercraft and an operation unit configured to receive an input operation for operating the actuator, wherein the watercraft control device operates the actuator on the basis of at least the input operation received by the operation unit, wherein the watercraft control device has a manual maneuvering mode in which the actuator is operated on the basis of the input operation received by the operation unit; and an automatic maneuvering mode in which the actuator is operated on the basis of a distance between the watercraft and the communication device and heading of the watercraft without any need for the operation unit to receive the input operation, and wherein, in the automatic maneuvering mode, the watercraft control device is able to execute first control which controls that a rate of decrease in a distance between the watercraft and the communication device is less than or equal to a first threshold value and second control which controls that the rate of decrease in the distance between the watercraft and the communication device is greater than the first threshold value.

According to an aspect of the present invention, there is provided a watercraft control method of controlling a watercraft including an actuator having a function of generating a propulsive force of the watercraft and a function of generating a turning moment in the watercraft and an operation unit configured to receive an input operation for operating the actuator, the watercraft control method including: a watercraft control step of operating the actuator on the basis of at least the input operation received by the operation unit, wherein the watercraft control step includes a manual maneuvering step of operating the actuator on the basis of the input operation received by the operation unit; and an automatic maneuvering step of operating the actuator on the basis of a distance between the watercraft and the communication device and heading of the watercraft without any need for the operation unit to receive the input operation, and wherein, in the automatic maneuvering step, first control which controls that a rate of decrease in a distance between the watercraft and the communication device is less than or equal to a first threshold value and second control which controls that the rate of decrease in the distance between the watercraft and the communication device is greater than the first threshold value can be executed.

According to an aspect of the present invention, there is provided a program for causing a computer, mounted in a watercraft including an actuator having a function of generating a propulsive force of the watercraft and a function of generating a turning moment in the watercraft, an operation unit configured to receive an input operation for operating the actuator, and a trigger generation unit configured to generate a trigger, to execute: a watercraft control step of operating the actuator on the basis of at least the input operation received by the operation unit, wherein the watercraft control step includes a manual maneuvering step of operating the actuator on the basis of the input operation received by the operation unit; and an automatic maneuvering step of operating the actuator on the basis of a distance between the watercraft and the communication device and heading of the watercraft without any need for the operation unit to receive the input operation, and wherein, in the automatic maneuvering step, first control which controls that a rate of decrease in a distance between the watercraft and the communication device is less than or equal to a first threshold value and second control which controls that the rate of decrease in the distance between the watercraft and the communication device is greater than the first threshold value can be executed.

Advantageous Effects of Invention

According to the present invention, it is possible to provide an automatic maneuvering system, a watercraft control device, a watercraft control method, and a program capable of appropriately performing a control process of returning a watercraft toward an occupant at a location away from the watercraft in automatic maneuvering.

DESCRIPTION OF EMBODIMENTS

First Embodiment

Figure 1:
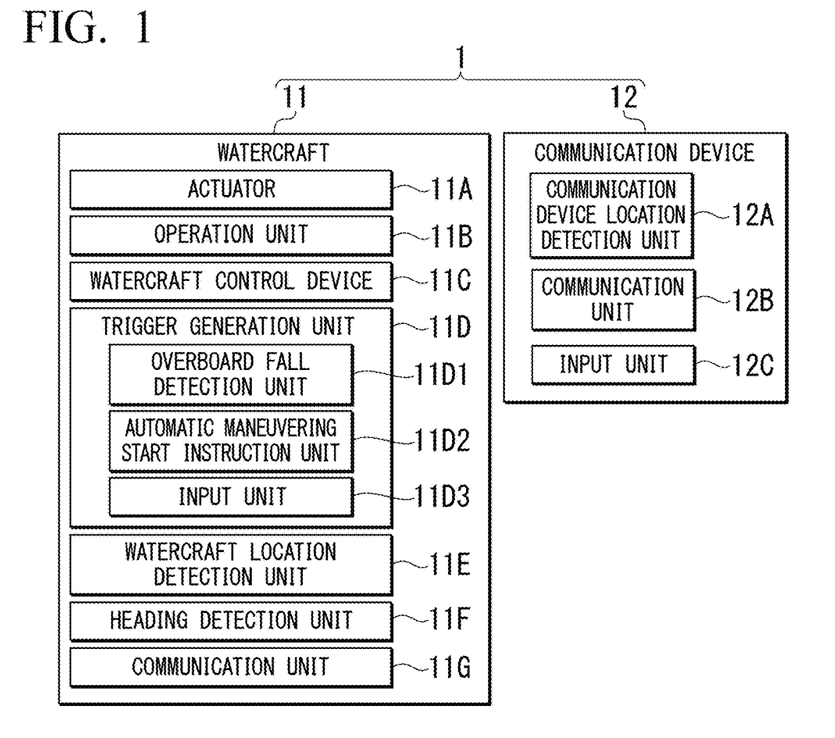
FIG. 1 is a diagram schematically showing an example of an automatic maneuvering system to which a watercraft control device of a first embodiment is applied.

A first embodiment of an automatic maneuvering system, a watercraft control device, a watercraft control method, and a program according to the present invention will be described below. FIG. 1 is a diagram schematically showing an example of an automatic maneuvering system 1 to which a watercraft control device 11C of the first embodiment is applied.

In the example shown in FIG. 1, the automatic maneuvering system 1 includes a watercraft 11 and a communication device 12.

The watercraft 11 of the first embodiment is, for example, a personal watercraft (PWC) (a water-motorcycle) having functions similar to those of the PWC described in FIG. 1 of Japanese Patent No. 5196649. The watercraft 11 includes an actuator 11A, an operation unit 11B, a watercraft control device 11C, a trigger generation unit 11D, a watercraft location detection unit 11E, a heading detection unit 11F, and a communication unit 11G.

The actuator 11A has a function of generating a propulsive force for the watercraft 11 and a function of generating a turning moment in the watercraft 11. The actuator 11A includes, for example, the engine, the nozzle, the deflector, the trim actuator, the bucket, the bucket actuator, and the like described in FIG. 1 of Japanese Unexamined Patent Application, First Publication No. 2019-171925.

The operation unit 11B receives an input operation by the watercraft operator who operates the actuator 11A. The operation unit 11B is configured like, for example, the steering handle device described in FIG. 1 of Japanese Patent No. 5196649, the steering unit described in FIG. 1 of Japanese Unexamined Patent Application, First Publication No. 2019-171925, or the like.

The watercraft control device 11C performs a control process of operating the actuator 11A on the basis of the input operation of the watercraft operator received by the operation unit 11B and the like. The watercraft control device 11C has a manual maneuvering mode in which the actuator 11A is operated on the basis of the input operation of the watercraft operator received by the operation unit 11B and an automatic maneuvering mode in which the actuator 11A is operated on the basis of a distance between the watercraft 11 and the communication device 12 and heading of the watercraft 11 without any need for the operation unit 11B to receive the input operation.

The trigger generation unit 11D generates a trigger for switching the mode of the watercraft control device 11C from the manual maneuvering mode to the automatic maneuvering mode. The trigger generation unit 11D includes an overboard fall detection unit 11D1, an automatic maneuvering start instruction unit 11D2, and an input unit 11D3.

The overboard fall detection unit 11D1 detects the falling of an occupant of the watercraft 11 (for example, a watercraft operator, an occupant other than the watercraft operator, or the like) overboard. The overboard fall detection unit 11D1 of the first embodiment is configured like, for example, the lanyard cord and the switch described in paragraph 0002 of Japanese Patent No. 4205261. Specifically, one end of the lanyard cord is connected to an overboard fall detection target person (for example, the watercraft operator, the occupant other than the watercraft operator, or the like). The other end of the lanyard cord is connected to a switch (not shown) arranged within the watercraft 11.

When the detection target person falls overboard from the watercraft 11, the other end of the lanyard cord is disconnected from the switch and the switch detects the falling of the detection target person overboard. As a result, the trigger generation unit 11D generates a trigger and the watercraft control device 11C switches the mode from the manual maneuvering mode to the automatic maneuvering mode.

The automatic maneuvering start instruction unit 11D2 outputs an automatic maneuvering start instruction on the basis of an automatic maneuvering start request transmitted from the communication device 12 (the "automatic maneuvering start request" will be described below).

When the automatic maneuvering start instruction unit 11D2 outputs the automatic maneuvering start instruction, the watercraft control device 11C starts a control (automatic maneuvering mode control) process of operating the actuator 11A without any need for the operation unit 11B to receive an input operation. The watercraft control device 11C controls the actuator 11A on the basis of a distance between the watercraft 11 and the communication device 12 and heading of the watercraft 11 in the automatic maneuvering mode.

In another example, the trigger generation unit 11D may not include the automatic maneuvering start instruction unit 11D2. In the present example, when the overboard fall detection unit 11D1 detects the falling of an occupant of the watercraft 11 overboard, the trigger generation unit 11D generates a trigger, and the watercraft control device 11C switches the mode from the manual maneuvering mode to the automatic maneuvering mode, and also starts the control of the automatic maneuvering mode.

In the example shown in FIG. 1, the input unit 11D3 receives, for example, the automatic maneuvering start request from the watercraft operator of the watercraft 11 (for example, the automatic maneuvering start request from the watercraft operator who is about to disembark from the watercraft 11 while carrying the communication device 12).

The automatic maneuvering start instruction unit 11D2 also outputs an automatic maneuvering start instruction when the input unit 11D3 receives the automatic maneuvering start request. When the automatic maneuvering start instruction unit 11D2 outputs the automatic maneuvering start instruction, the watercraft control device 11C starts a control process of operating the actuator 11A (a process of controlling the automatic maneuvering mode) without any need for the operation unit 11B to receive an input operation. In the automatic maneuvering mode, the watercraft control device 11C controls the actuator 11A on the basis of the distance between the watercraft 11 and the communication device 12 (in detail, the communication device 12 carried by the watercraft operator who has disembarked from the watercraft 11) and heading of the watercraft 11.

In another example, the trigger generation unit 11D may not include the input unit 11D3.

In the examples shown in FIG. 1, the watercraft location detection unit 11E detects a location of the watercraft 11. The watercraft location detection unit 11E includes, for example, a Global Positioning System (GPS) device. The GPS device calculates location coordinates of the watercraft 11 by receiving signals from a plurality of GPS satellites. The location of the watercraft 11 detected by the watercraft location detection unit 11E is used for controlling the automatic maneuvering mode of the watercraft control device 11C described above.

The heading detection unit 11F detects the heading of the watercraft 11. The heading detection unit 11F includes, for example, a direction sensor. The direction sensor calculates the heading of the watercraft 11 using, for example, geomagnetism. The heading of the watercraft 11 detected by the heading detection unit 11F is used for controlling the automatic maneuvering mode of the watercraft control device 11C.

In another example, the direction sensor may be a device (a gyrocompass) in which a north-pointing device and a damping device are added to a gyroscope that rotates at a high speed so that north is indicated all the time.

In yet another example, the direction sensor may be a GPS compass that includes a plurality of GPS antennas and calculates the heading from a relative locational relationship of the plurality of GPS antennas.

In the examples shown in FIG. 1, the communication unit 11G communicates with the communication device 12.

The communication device 12 is carried by the above-described overboard fall detection target person (occupant). The communication device 12 includes a communication device location detection unit 12A, a communication unit 12B, and an input unit 12C.

The communication device location detection unit 12A detects the location of the communication device 12. The communication device location detection unit 12A includes, for example, a GPS device. The GPS device calculates location coordinates of the communication device 12 by receiving signals from a plurality of GPS satellites.

The input unit 12C receives, for example, the automatic maneuvering start request from the watercraft operator of the watercraft 11 (for example, the automatic maneuvering start request from the watercraft operator who has fallen overboard from the watercraft 11 while carrying the communication device 12).

The communication unit 12B transmits information indicating the location of the communication device 12 detected by the communication device location detection unit 12A to the watercraft 11. The communication unit 11G of the watercraft 11 receives the information indicating the location of the communication device 12 transmitted by the communication unit 12B. The location of the communication device 12 detected by the communication device location detection unit 12A is used for controlling the automatic maneuvering mode of the watercraft control device 11C.

Also, the communication unit 12B transmits the automatic maneuvering start request received by the input unit 12C to the watercraft 11. The communication unit 11G of the watercraft 11 receives the automatic maneuvering start request transmitted by the communication unit 12B. As described above, the automatic maneuvering start instruction unit 11D2 of the watercraft 11 outputs the automatic maneuvering start instruction on the basis of the automatic maneuvering start request transmitted from the communication device 12.

In another example, the communication device 12 may not include the input unit 12C. In the present example, the communication unit 12B does not transmit the automatic maneuvering start request to the watercraft 11 and the watercraft control device 11C starts the control of the automatic maneuvering mode on the basis of a trigger generated by the trigger generation unit 11D.

Although the trigger generation unit 11D of the watercraft 11 generates a trigger for switching the mode of the watercraft control device 11C from the manual maneuvering mode to the automatic maneuvering mode in the example shown in FIG. 1, a function of generating a trigger for switching the mode of the watercraft control device 11C from the manual maneuvering mode to the automatic maneuvering mode may be provided in the communication device 12 in another example.

In the example shown in FIG. 1, as described above, a distance between the watercraft 11 and the communication device 12 is calculated on the basis of a location of the watercraft 11 detected by the watercraft location detection unit 11E and a location of the communication device 12 detected by the communication device location detection unit 12A and the calculated distance is used for controlling the automatic maneuvering mode of the watercraft control device 11C. In another example, the watercraft 11 includes a distance detection unit such as a camera or radar, and the distance detection unit detects a distance between the watercraft 11 and the communication device 12 and the detected distance may be used for controlling the automatic maneuvering mode of the watercraft control device 11C.

Figure 2:
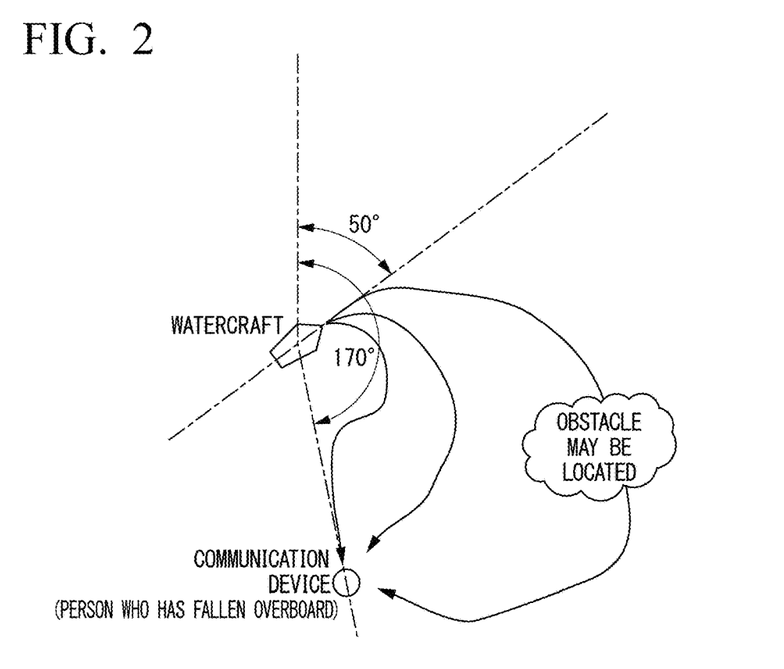
FIG. 2 is a diagram for describing an example of a situation that can occur when the falling of an occupant of a watercraft overboard has been detected by an overboard fall detection unit.

FIG. 2 is a diagram for describing an example of a situation that can occur when the overboard fall detection unit 11D1 has detected the falling of an occupant of the watercraft 11 overboard.

When the overboard fall detection unit 11D1 has detected the falling of an occupant of the watercraft 11 overboard (a person who has fallen overboard), the bow of the watercraft 11 may not be directed to a person who has fallen overboard, i.e., an angle difference (about 120° (170°-50°)) between a heading angle of the watercraft 11 (about 50° clockwise in the upward direction of FIG. 2) and an azimuth angle of the communication device 12 in the watercraft 11 (about 170° clockwise in the upward direction of FIG. 2) may be large as shown in FIG. 2.

In this case, there may be a problem that, if control is not appropriately performed to automatically return the watercraft 11 to an occupant (the person who has fallen overboard) at a location away from the watercraft 11, an auto-return process of the watercraft 11 is time-consuming, it is difficult to ensure the safety of a return route (i.e., the watercraft 11 passes through a location where safety is not ensured (for example, a location where an obstacle is located)), the person who has fallen overboard has an uncomfortable feeling when viewing that the watercraft 11 moves in a direction away from him or her, or the like.

Therefore, in the automatic maneuvering system 1 of the first embodiment, the watercraft control device 11C executes control in the automatic maneuvering mode as will be described below.

Figure 3A:
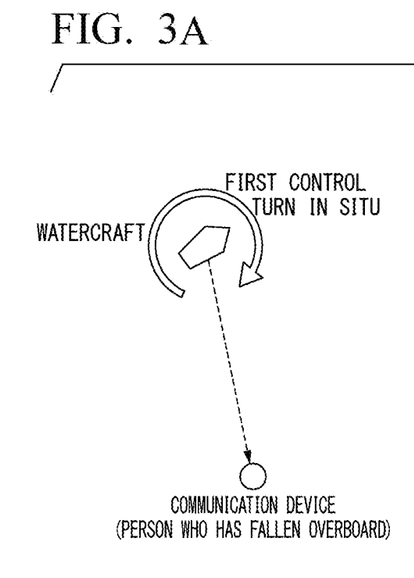
FIG. 3A and FIG. 3B are diagrams for describing an example of control of an automatic maneuvering mode executed by the watercraft control device of the first embodiment.
Figure 3B:
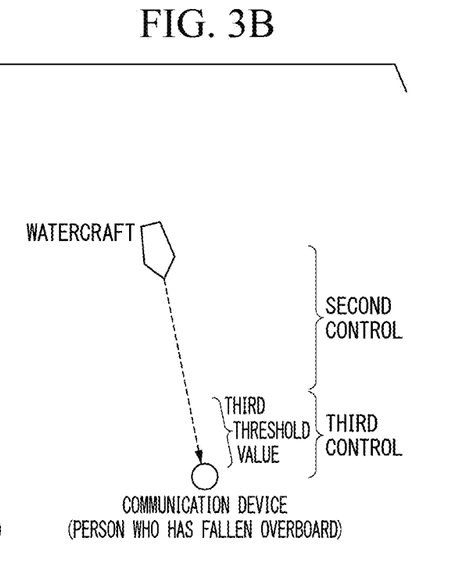

FIG. 3A and FIG. 3B are diagrams for describing an example of control of the automatic maneuvering mode executed by the watercraft control device 11C of the first embodiment.

In the example shown in FIG. 3A and FIG. 3B, as in the example shown in FIG. 2, the bow of the watercraft 11 is not directed to the person who has fallen overboard when the overboard fall detection unit 11D1 detects the falling of the occupant of the watercraft 11 overboard (the person who has fallen overboard).

In detail, when the overboard fall detection unit 11D1 detects the falling of the occupant of the watercraft 11 overboard (the person who has fallen overboard), an angle difference (about 120° (170°-50°)) between a heading angle of the watercraft 11 (about 50° clockwise in the upward direction of FIG. 3A) and an azimuth angle of the communication device 12 in the watercraft 11 (about 170° clockwise in the upward direction of FIG. 3A) is greater than a prescribed threshold value (second threshold value) as shown in FIG. 3A.

Thus, the watercraft control device 11C first executes the first control for decreasing the angle difference. In detail, the watercraft control device 11C executes the first control which controls that a rate of decrease in the distance between the watercraft 11 and the communication device 12 is less than or equal to a first threshold value. For example, the watercraft control device 11C executes a control process of causing the watercraft 11 to turn in situ as the first control. As a result, as shown in FIG. 3B, the bow of the watercraft 11 is directed to the person who has fallen overboard.

Subsequently, the watercraft control device 11C executes second control for decreasing the distance between the watercraft 11 and the communication device 12. In detail, the watercraft control device 11C performs the second control which controls that the rate of decrease in the distance between the watercraft 11 and the communication device 12 is greater than the first threshold value. For example, the watercraft control device 11C executes a control process of causing the watercraft 11 to move substantially straight as the second control.

As a result, in the example shown in FIG. 3A and FIG. 3B, the auto-return process of the watercraft 11 can be completed in a short time. Also, the person who has fallen overboard can easily confirm the safety of the return route because it is only necessary to confirm the presence or absence of an obstacle on a straight line connecting a location of the watercraft 11 and a location of the communication device 12. Furthermore, because the watercraft 11 moves substantially straight toward the person who has fallen overboard, it is possible to give the person who has fallen overboard a sense of safety.

That is, in the example shown in FIG. 3A and FIG. 3B, the watercraft control device 11C starts the control of the automatic maneuvering mode in the order of the first control and the second control.

In detail, in the example shown in FIG. 3B, the watercraft control device 11C performs control based on the angle difference between the heading angle of the watercraft 11 and the azimuth angle of the communication device 12 of the watercraft 11 (for example, feedback control for setting the angle difference to zero) when the first control is executed. Also, the watercraft control device 11C performs control based on the angle difference between the heading angle of the watercraft 11 and the azimuth angle of the communication device 12 of the watercraft 11 (for example, feedback control for setting the angle difference to zero) when the second control is executed.

Thus, in the example shown in FIG. 3B, the bow of the watercraft 11 can continue to be directed toward the person who has fallen overboard even in the case where the tidal current or wind is strong or the like.

As described above, in the example shown in FIG. 3A, the watercraft control device 11C executes control for causing the watercraft 11 to turn in situ as the first control.

In another example, the watercraft control device 11C may execute control for preventing the watercraft 11 from turning in situ as the first control. In the present example, the distance between the watercraft 11 and the communication device 12 also decreases while the above-described first control is being executed (i.e., the control is being executed to cause the bow of the watercraft 11 to turn toward the person who has fallen overboard). In other words, the watercraft control device 11C executes control for causing the watercraft 11 to turn slightly as the first control.

In the present example, the auto-return process of the watercraft 11 can also be completed in a short time. Also, the person who has fallen overboard can easily confirm the safety of the return route because it is only necessary to confirm the presence or absence of an obstacle on a route connecting the location of the watercraft 11 and the location of the communication device 12. Furthermore, because the watercraft 11 moves forward while approaching the person who has fallen overboard, it is possible to give the person who has fallen overboard a sense of safety.

Unlike the example shown in FIG. 3A and FIG. 3B, when the overboard fall detection unit 11D1 detects the falling of an occupant of the watercraft 11 overboard (a person who has fallen overboard), the bow of the watercraft 11 may be directed to the person who has fallen overboard.

Figure 4:
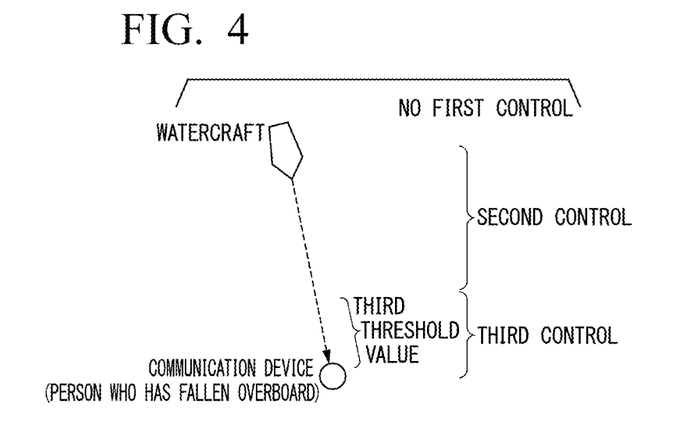
FIG. 4 is a diagram for describing another example of the control of the automatic maneuvering mode executed by the watercraft control device of the first embodiment.

FIG. 4 is a diagram for describing another example of the control of the automatic maneuvering mode executed by the watercraft control device 11C of the first embodiment.

In the example shown in FIG. 4, when the overboard fall detection unit 11D1 has detected the falling of an occupant of the watercraft 11 overboard (a person who has fallen overboard), the bow of the watercraft 11 is directed to the person who has fallen overboard.

In detail, when the overboard fall detection unit 11D1 has detected the falling of the occupant of the watercraft 11 overboard (the person who has fallen overboard), an angle difference (about 0° (170°-170°)) between a heading angle of the watercraft 11 (about 170° clockwise in the upward direction of FIG. 4) and an azimuth angle of the communication device 12 in the watercraft 11 (about 170° clockwise in the upward direction of FIG. 4) is less than or equal to a second threshold value.

In the example shown in FIG. 4, the watercraft control device 11C starts control of the automatic maneuvering mode according to the second control without executing the first control. That is, the watercraft control device 11C starts the control of the automatic maneuvering mode by executing the second control for decreasing the distance between the watercraft 11 and the communication device 12.

In detail, the watercraft control device 11C executes the second control which controls that the rate of decrease in the distance between the watercraft 11 and the communication device 12 is greater than the first threshold value. For example, the watercraft control device 11C executes control for causing the watercraft 11 to move substantially straight as the second control.

As a result, in the example shown in FIG. 4, the auto-return process of the watercraft 11 can be completed in a short time. Also, the person who has fallen overboard can easily confirm the safety of the return route because it is only necessary to confirm the presence or absence of an obstacle on a straight line connecting the location of the watercraft 11 and the location of the communication device 12. Furthermore, because the watercraft 11 moves substantially straight toward the person who has fallen overboard, it is possible to give the person who has fallen overboard a sense of safety.

Specifically, in the example shown in FIG. 4, the watercraft control device 11C performs control based on the angle difference between the heading angle of the watercraft 11 and the azimuth angle of the communication device 12 of the watercraft 11 (for example, feedback control for setting the angle difference to zero) when the second control is executed.

Thus, in the example shown in FIG. 4, when the overboard fall detection unit 11D1 has detected the falling of the occupant of the watercraft 11 overboard (the person who has fallen overboard), the bow of the watercraft 11 can be directed to the person who has fallen overboard and the watercraft 11 can be brought close to the person who has fallen overboard even if the above-described angle difference is not zero.

That is, in the automatic maneuvering system 1 of the first embodiment, the watercraft control device 11C can execute the first control which controls that the rate of the decrease of the distance between the watercraft 11 and the communication device 12 is less than or equal to the first threshold value (i.e., a forward speed at which the watercraft 11 approaches the communication device 12 is low or zero) and the second control which controls that the rate of the decrease of the distance between the watercraft 11 and the communication device 12 is greater than the first threshold value (i.e., the forward speed at which the watercraft 11 approaches the communication device 12 is high) in the automatic maneuvering mode.

In detail, in the example shown in FIG. 3B, the watercraft control device 11C executes third control for decreasing the forward speed of the watercraft 11 to, for example, zero, when the distance between the watercraft 11 and the communication device 12 is less than or equal to a prescribed threshold value (a third threshold value).

That is, in the example shown in FIG. 3B, in the automatic maneuvering mode, the watercraft control device 11C executes the second control if the distance between the watercraft 11 and the communication device 12 is greater than the third threshold value and executes the third control which controls that the rate of decrease in the distance between the watercraft 11 and the communication device 12 described above is less than that when the second control is executed (for example, control which controls that the rate of decrease in the distance between the watercraft 11 and the communication device 12 becomes zero) if the distance between the watercraft 11 and the communication device 12 is less than or equal to the third threshold value.

Likewise, in the example shown in FIG. 4, the watercraft control device 11C executes the third control for decreasing the forward speed of the watercraft 11 to, for example, zero, when the distance between the watercraft 11 and the communication device 12 is less than or equal to the third threshold value.

Figure 5:
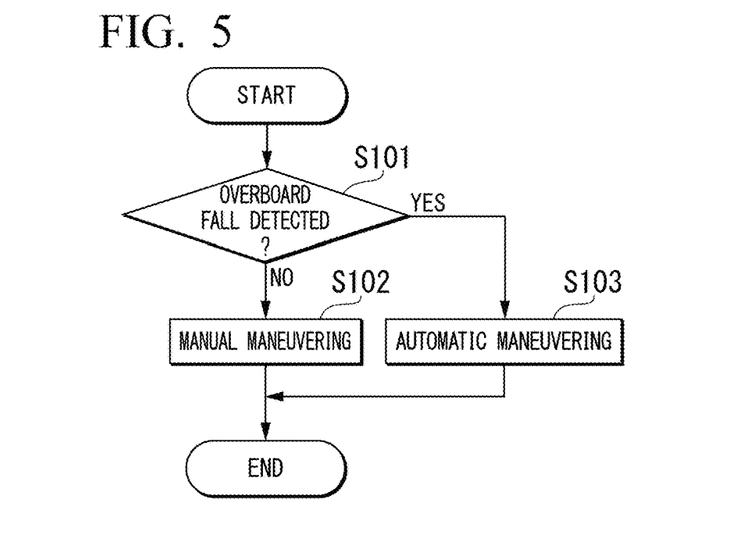
FIG. 5 is a flowchart for describing an example of a process executed by the automatic maneuvering system of the first embodiment.

FIG. 5 is a flowchart for describing an example of a process executed in the automatic maneuvering system 1 of the first embodiment.

In the example shown in FIG. 5, in step S101, for example, the watercraft control device 11C of the watercraft 11 determines whether or not the overboard fall detection unit 11D1 has detected the falling of an occupant of the watercraft 11 overboard. When the overboard fall detection unit 11D1 has not detected the falling of an occupant of the watercraft 11 overboard, the process proceeds to step S102. On the other hand, when the overboard fall detection unit 11D1 has detected the falling of an occupant of the watercraft 11 overboard, the process proceeds to step S103.

In step S102, the watercraft control device 11C executes control of the manual maneuvering mode.

In step S103, the watercraft control device 11C executes control of the automatic maneuvering mode.

Figure 6:
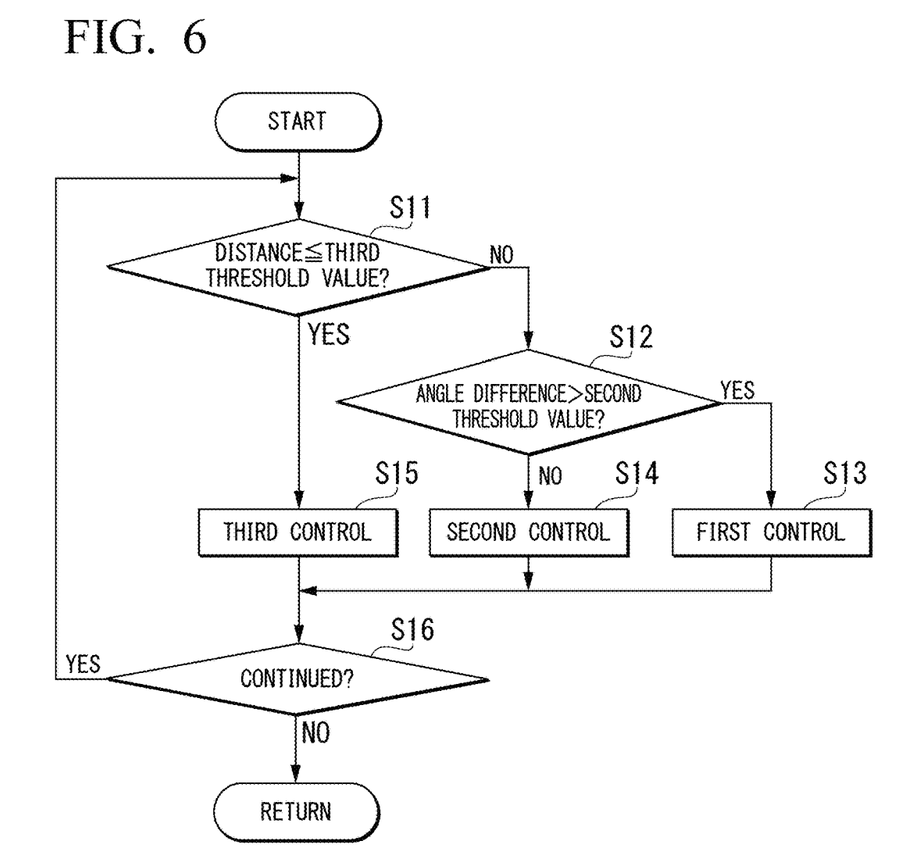
FIG. 6 is a flowchart for describing a process executed in step S103 of FIG. 5 in detail.

FIG. 6 is a flowchart for describing a process executed in step S103 of FIG. 5 in detail.

In the example shown in FIG. 6, in step S11, for example, the watercraft control device 11C determines whether or not the distance between the watercraft 11 and the communication device 12 is less than or equal to the third threshold value. When the distance between the watercraft 11 and the communication device 12 is greater than the third threshold value, the process proceeds to step S12. On the other hand, when the distance between the watercraft 11 and the communication device 12 is less than or equal to the third threshold value, the process proceeds to step S15.

In step S12, for example, the watercraft control device 11C determines whether or not an angle difference between the heading angle of the watercraft 11 and the azimuth angle of the communication device 12 in the watercraft 11 is greater than the second threshold value. When the angle difference between the heading angle of the watercraft 11 and the azimuth angle of the communication device 12 in the watercraft 11 is greater than the second threshold value, the process proceeds to step S13. On the other hand, when the angle difference between the heading angle of the watercraft 11 and the azimuth angle of the communication device 12 in the watercraft 11 is less than or equal to the second threshold value, the process proceeds to step S14.

In step S13, the watercraft control device 11C executes the first control which controls that the rate of decrease in the distance between the watercraft 11 and the communication device 12 is less than or equal to the first threshold value and then proceeds to step S16.

In step S14, the watercraft control device 11C executes the second control which controls that the rate of decrease in the distance between the watercraft 11 and the communication device 12 is greater than the first threshold value and then proceeds to step S16.

In step S15, the watercraft control device 11C executes the third control which controls that the rate of decrease in the distance between the watercraft 11 and the communication device 12 is less than that when the second control is executed (control which controls that the rate of decrease in the distance between the watercraft 11 and the communication device 12 becomes zero), and then proceeds to step S16.

In step S16, for example, the watercraft control device 11C determines whether or not to continue control of the automatic maneuvering mode. When the control of the automatic maneuvering mode is continued, the process returns to step S11. On the other hand, when the control of the automatic maneuvering mode is not continued, the routine shown in FIG. 6 is terminated.

Second Embodiment

A second embodiment of an automatic maneuvering system, a watercraft control device, a watercraft control method, and a program of the present invention will be described below.

An automatic maneuvering system 1 of the second embodiment is configured like the automatic maneuvering system 1 of the first embodiment described above, except for differences to be described below. Accordingly, according to the automatic maneuvering system 1 of the second embodiment, it is possible to obtain effects similar to those of the automatic maneuvering system 1 of the first embodiment described above, except for the differences to be described below.

As described above, in the automatic maneuvering system 1 of the first embodiment, the overboard fall detection unit 11D1 of the watercraft 11 is configured like, for example, the lanyard cord and the switch described in paragraph 0002 of Japanese Patent No. 4205261, and detects the falling of an occupant of the watercraft 11 (for example, a watercraft operator or an occupant other than the watercraft operator) overboard when the other end of the lanyard cord has been disconnected from the switch.

On the other hand, in the automatic maneuvering system 1 of the second embodiment, an overboard fall detection unit 11D1 detects the falling of an occupant of a watercraft 11 overboard on the basis of a distance between a location of the watercraft 11 detected by a watercraft location detection unit 11E and a location of a communication device 12 detected by a communication device location detection unit 12A of the communication device 12. In detail, when the distance between the location of the watercraft 11 and the location of the communication device 12 is greater than a prescribed threshold value, the overboard fall detection unit 11D1 estimates that the occupant of the watercraft 11 has fallen overboard. As a result, when a trigger generation unit 11D generates a trigger, a watercraft control device 11C switches the mode from the manual maneuvering mode to the automatic maneuvering mode. Furthermore, when an input unit 12C of the communication device 12 has received an automatic maneuvering start request, the watercraft control device 11C operates an actuator 11A on the basis of the distance between the watercraft 11 and the communication device 12 and heading of the watercraft 11. That is, the watercraft control device 11C starts control of an automatic maneuvering mode.

Third Embodiment

A third embodiment of an automatic maneuvering system, a watercraft control device, a watercraft control method, and a program of the present invention will be described below.

An automatic maneuvering system 1 of the third embodiment is configured like the automatic maneuvering system 1 of the first embodiment described above, except for differences to be described below. Accordingly, according to the automatic maneuvering system 1 of the third embodiment, it is possible to obtain effects similar to those of the automatic maneuvering system 1 of the first embodiment described above, except for the differences to be described below.

As described above, the watercraft 11 of the first embodiment is, for example, a PWC (a water-motorcycle) having functions similar to those of the PWC described in FIG. 1 of Japanese Patent No. 5196649.

On the other hand, a watercraft 11 of the third embodiment is, for example, a watercraft having functions similar to those of the watercraft described in FIG. 1 of Japanese Patent No. 6198192.

An actuator 11A of the watercraft 11 of the third embodiment has a function of generating a propulsive force for the watercraft 11 and a function of generating a turning moment in the watercraft 11. The actuator 11A includes, for example, the outboard motor, the engine, the actuator, the shift mechanism, and the like described in FIG. 1 of Japanese Patent No. 6198192.

An operation unit 11B of the watercraft 11 of the third embodiment receives an input operation by a watercraft operator who operates the actuator 11A. The operation unit 11B is configured like, for example, the steering wheel, the remote-control device, the operation lever, and the like described in FIG. 1 of Japanese Patent No. 6198192. For example, a joystick and the like may be included in the operation unit 11B of the watercraft 11 of the third embodiment.

Fourth Embodiment

A fourth embodiment of an automatic maneuvering system, a watercraft control device, a watercraft control method, and a program of the present invention will be described below.

An automatic maneuvering system 1 of the fourth embodiment is configured like the automatic maneuvering system 1 of the first embodiment described above, except for differences to be described below. Accordingly, according to the automatic maneuvering system 1 of the fourth embodiment, it is possible to obtain effects similar to those of the automatic maneuvering system 1 of the first embodiment described above, except for the differences to be described below.

Figure 7:
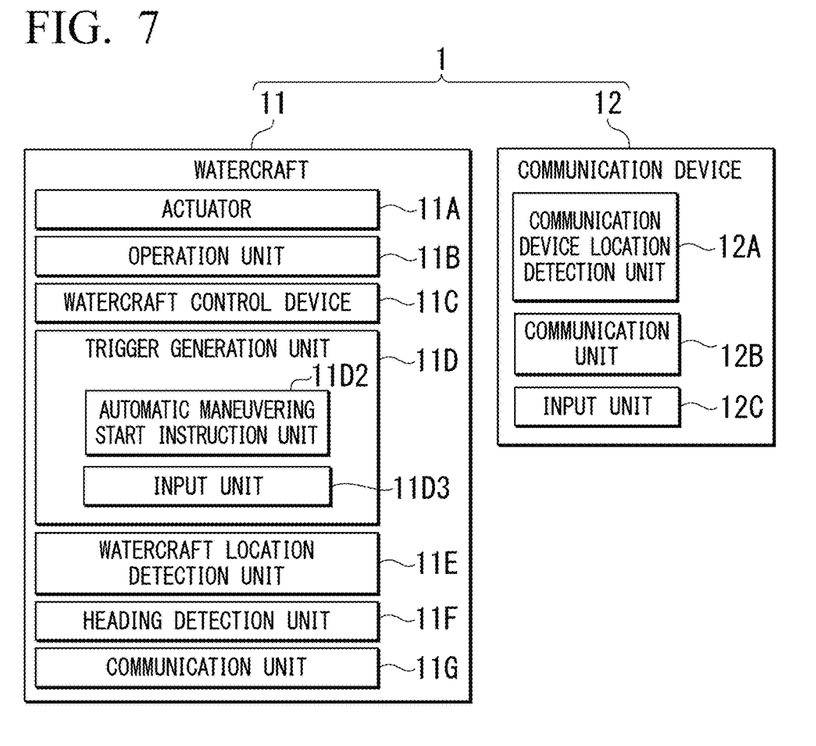
FIG. 7 is a diagram schematically showing an example of an automatic maneuvering system to which a watercraft control device of a fourth embodiment is applied.

FIG. 7 is a diagram schematically showing an example of the automatic maneuvering system 1 to which a watercraft control device 11C of the fourth embodiment is applied.

In the example shown in FIG. 7, the automatic maneuvering system 1 includes a watercraft 11 and a communication device 12.

The watercraft 11 of the fourth embodiment is, for example, a PWC having functions similar to those of the PWC described in FIG. 1 of Japanese Patent No. 5196649. The watercraft 11 includes an actuator 11A configured like the actuator 11A of the first embodiment, an operation unit 11B configured like the operation unit 11B of the first embodiment, a watercraft control device 11C, a trigger generation unit 11D, a watercraft location detection unit 11E configured like the watercraft location detection unit 11E of the first embodiment, a heading detection unit 11F configured like the heading detection unit 11F of the first embodiment, and a communication unit 11G configured like the communication unit 11G of the first embodiment.

The trigger generation unit 11D generates a trigger for switching the mode of the watercraft control device 11C from a manual maneuvering mode to an automatic maneuvering mode. The trigger generation unit 11D includes an automatic maneuvering start instruction unit 11D2 and an input unit 11D3.

The input unit 11D3 receives, for example, an automatic maneuvering start request from a watercraft operator of the watercraft 11 (for example, an automatic maneuvering start request from the watercraft operator who is about to disembark from the watercraft 11 while carrying the communication device 12).

The automatic maneuvering start instruction unit 11D2 outputs an automatic maneuvering start instruction when the input unit 11D3 has received the automatic maneuvering start request or when an input unit 12C of the communication device 12 has received the automatic maneuvering start request. When the automatic maneuvering start instruction unit 11D2 outputs the automatic maneuvering start instruction, the watercraft control device 11C starts a control process of operating the actuator 11A (a process of controlling the automatic maneuvering mode) without any need for the operation unit 11B to receive an input operation. In the automatic maneuvering mode, the watercraft control device 11C controls the actuator 11A on the basis of a distance between the watercraft 11 and the communication device 12 (in detail, the communication device 12 carried by the watercraft operator who has disembarked from the watercraft 11) and heading of the watercraft 11.

Like the watercraft control device 11C of the first embodiment, the watercraft control device 11C of the fourth embodiment has a manual watercraft operation mode in which the actuator 11A is operated on the basis of the watercraft operator's input operation received by the operation unit 11B and an automatic maneuvering mode in which the actuator 11A is operated on the basis of the distance between the watercraft 11 and the communication device 12 and the heading of the watercraft 11 without any need for the operation unit 11B to receive an input operation.

In the example shown in FIG. 7, the communication device 12 is carried by, for example, the watercraft operator of the watercraft 11. The communication device 12 includes a communication device location detection unit 12A configured like the communication device location detection unit 12A of the first embodiment, a communication unit 12B configured like the communication unit 12B of the first embodiment, and the input unit 12C.

The input unit 12C receives, for example, an automatic maneuvering start request from the watercraft operator of the watercraft 11 (for example, an automatic maneuvering start request from the watercraft operator carrying the communication device 12 and disembarking from the watercraft 11, i.e., an automatic maneuvering start request from the watercraft operator on land).

The communication unit 12B transmits information indicating a location of the communication device 12 detected by the communication device location detection unit 12A to the watercraft 11. The location of the communication device 12 detected by the communication device location detection unit 12A is used for controlling the automatic maneuvering mode of the watercraft control device 11C.

Also, the communication unit 12B transmits the automatic maneuvering start request received by the input unit 12C to the watercraft 11. As described above, the automatic maneuvering start instruction unit 11D2 of the watercraft 11 outputs an automatic maneuvering start instruction on the basis of the automatic maneuvering start request transmitted from the communication device 12.

Figure 8:
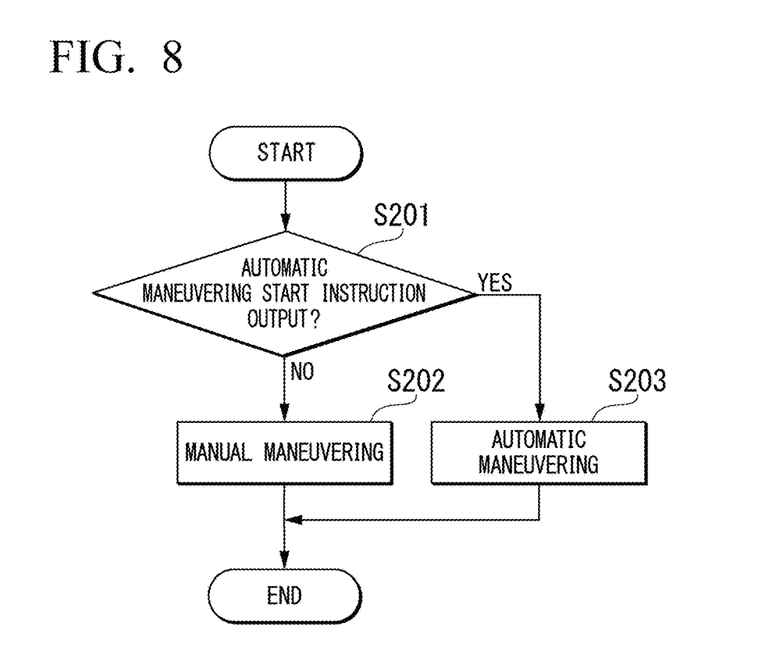
FIG. 8 is a flowchart for describing an example of a process executed by the automatic maneuvering system of the fourth embodiment.

FIG. 8 is a flowchart for describing an example of a process executed in the automatic maneuvering system 1 of the fourth embodiment.

In the example shown in FIG. 8, in step S201, for example, the watercraft control device 11C of the watercraft 11 determines whether the automatic maneuvering start instruction unit 11D2 has output an automatic maneuvering start instruction (whether or not there is an automatic maneuvering start request from the watercraft operator who is about to disembark or the disembarked watercraft operator). When the automatic maneuvering start instruction unit 11D2 has not output the automatic maneuvering start instruction (i.e., for example, when there is no automatic maneuvering start request from the watercraft operator), the process proceeds to step S202. On the other hand, when the automatic maneuvering start instruction unit 11D2 has output the automatic maneuvering start instruction (i.e., for example, when the watercraft operator has issued the automatic maneuvering start request), the process proceeds to step S203.

In step S202, the watercraft control device 11C executes control of the manual maneuvering mode.

In step S203, the watercraft control device 11C executes control of the automatic maneuvering mode. In detail, in step S203, the watercraft 11 is automatically moved toward the watercraft operator at a location away from the watercraft 11.

In the automatic maneuvering system 1 of the fourth embodiment, as in the example shown in FIG. 3A and FIG. 3B, the watercraft control device 11C starts control of the automatic maneuvering mode in the order of first control and second control if an angle difference between a heading angle of the watercraft 11 and an azimuth angle of the communication device 12 of the watercraft 11 is greater than a second threshold value when the automatic maneuvering start instruction unit 11D2 has output the automatic maneuvering start instruction.

Also, in the automatic maneuvering system 1 of the fourth embodiment, as in the example shown in FIG. 4, the watercraft control device 11C starts the control of the automatic maneuvering mode according to the second control without executing the first control if the angle difference between the heading angle of the watercraft 11 and the azimuth angle of the communication device 12 of the watercraft 11 is less than or equal to the second threshold value when the automatic maneuvering start instruction unit 11D2 has output the automatic maneuvering start instruction.

Although modes for carrying out the present invention have been described using embodiments, the present invention is not limited to the embodiments and various modifications and substitutions can also be made without departing from the scope and spirit of the present invention. The configurations described in the above-described embodiments and examples may be combined.

Also, all or some of the functions of the parts provided in the automatic maneuvering system 1 according to the above-described embodiment may be implemented by recording a program for implementing the functions on a computer-readable recording medium and causing a computer system to read and execute the program recorded on the recording medium. Also, the "computer system" described here is assumed to include an operating system (OS) and hardware such as peripheral devices.

Also, the "computer-readable recording medium" refers to a flexible disk, a magneto-optical disc, a read only memory (ROM), a portable medium such as a compact disc (CD)-ROM, or a storage unit such as a hard disk embedded in the computer system. Further, the "computer-readable recording medium" may include a computer-readable recording medium for dynamically retaining the program for a short time period as in a communication line when the program is transmitted via a network such as the Internet or a communication circuit such as a telephone circuit and a computer-readable recording medium for retaining the program for a given time period as in a volatile memory inside the computer system serving as a server or a client when the program is transmitted. Also, the above-described program may be a program for implementing some of the above-described functions. Further, the above-described program may be a program capable of implementing the above-described function in combination with a program already recorded on the computer system.

REFERENCE SIGNS LIST

1 Automatic maneuvering system
11 Watercraft
11A Actuator
11B Operation unit
11C Watercraft control device
11D Trigger generation unit
11D1 Overboard fall detection unit
11D2 Automatic maneuvering start instruction unit
11D3 Input unit
11E Watercraft location detection unit
11F Heading detection unit
11G Communication unit
12 Communication device
12A Communication device location detection unit
12B Communication unit
12C Input unit

The invention claimed is:
1. An automatic maneuvering system including a watercraft and a communication device,
wherein the watercraft includes
an actuator having a function of generating a propulsive force of the watercraft and a function of generating a turning moment in the watercraft;
an operation unit configured to receive an input operation for operating the actuator;
a watercraft control device configured to operate the actuator on the basis of at least the input operation received by the operation unit;
a watercraft location detection unit configured to detect a location of the watercraft; and
a heading detection unit configured to detect a heading of the watercraft,
wherein the communication device includes a communication device location detection unit configured to detect a location of the communication device,
wherein the watercraft control device has
a manual maneuvering mode in which the actuator is operated on the basis of the input operation received by the operation unit; and
an automatic maneuvering mode in which the actuator is operated without any need for the operation unit to receive the input operation,
wherein the watercraft control device is switched to the automatic maneuvering mode when a request of the automatic maneuvering mode is received from a watercraft operator or an occupant when the communication device is carried by the watercraft operator or the occupant and the watercraft operator or the occupant is away from the watercraft,
wherein, in the automatic maneuvering mode, the watercraft control device calculates a distance between the watercraft and the communication device and an angle difference between a heading angle of the watercraft and an azimuth angle of the communication device in the watercraft, based on the location of the watercraft detected by the watercraft location detection unit, the heading of the watercraft detected by the heading detection unit, and the location of the communication device detected by the communication device location detection unit when the request of the automatic maneuvering mode is received,
the watercraft control device is able to execute a first control, a second control and a third control, without any need for the operation unit to receive the input operation based on the distance between the watercraft and the communication device and the angle difference between the heading angle of the watercraft and the azimuth angle of the communication device in the watercraft, calculated when the request of the automatic maneuvering mode is received,
the first control is the control for causing the watercraft to turn in situ so that a bow of the watercraft is directed to the watercraft operator or the occupant who is away from the watercraft based on the angle difference between the heading angle of the watercraft and the azimuth angle of the communication device in the watercraft, or for causing the watercraft to turn so that the bow of the watercraft is directed to the watercraft operator or the occupant who is away from the watercraft with the watercraft moving toward the communication device, and
the second control is the control for causing the watercraft to move substantially straight toward the watercraft operator or the occupant who is away from the water- craft, with a return route on a straight line connecting the location of the watercraft and the location of the communication device, after the first control, and the third control is the control for controlling in which the rate of decrease in the distance between the watercraft and the communication device becomes zero when the distance between the watercraft and the communication device becomes less than or equal to a predetermined distance while the second control is being executed.

2. The automatic maneuvering system according to claim 1, comprising a trigger generation unit configured to generate a trigger for switching a mode of the watercraft control device from the manual maneuvering mode to the automatic maneuvering mode, wherein the trigger generation unit includes an automatic maneuvering start instruction unit configured to output an automatic maneuvering start instruction on the basis of an automatic maneuvering start request received by the watercraft or the communication device, and wherein, when the automatic maneuvering start instruction unit has output the automatic maneuvering start instruction, the watercraft control device starts control of the automatic maneuvering mode.

3. The automatic maneuvering system according to claim 2, wherein the trigger generation unit includes an overboard fall detection unit configured to detect the falling of an occupant of the watercraft overboard, and wherein, when the overboard fall detection unit has detected the falling of the occupant of the watercraft overboard, the watercraft control device is in the automatic maneuvering mode.

4. The automatic maneuvering system according to claim 3, wherein the communication device includes an input unit configured to receive the automatic maneuvering start request, and wherein, when the input unit has received the automatic maneuvering start request after the overboard fall detection unit detected the falling of the occupant of the watercraft overboard, the automatic maneuvering start instruction unit outputs an automatic maneuvering start instruction and the watercraft control device starts the control of the automatic maneuvering mode.

5. The automatic maneuvering system according to claim 4, wherein, when the overboard fall detection unit detects the falling of the occupant of the watercraft overboard, the input unit waits for the automatic maneuvering start request to be received.

6. The automatic maneuvering system according to claim 3, wherein, if an angle difference between a heading angle of the watercraft and an azimuth angle of the communication device is greater than a threshold value when the overboard fall detection unit has detected the falling of the occupant of the watercraft overboard, the watercraft control device starts the control of the automatic maneuvering mode in the order of the first control and the second control, and wherein, if the angle difference is less than or equal to the threshold value when the overboard fall detection unit has detected the falling of the occupant of the watercraft overboard, the watercraft control device starts the control of the automatic maneuvering mode according to the second control without executing the first control.

7. The automatic maneuvering system according to claim 1, wherein, when the first control is executed, the watercraft control device executes control based on an angle difference between a heading angle of the watercraft and an azimuth angle of the communication device.

8. The automatic maneuvering system according to claim 1, wherein, when the second control is executed, the watercraft control device executes control based on an angle difference between a heading angle of the watercraft and an azimuth angle of the communication device.

9. The automatic maneuvering system according to claim 2, wherein, if an angle difference between a heading angle of the watercraft and an azimuth angle of the communication device is greater than a threshold value when the automatic maneuvering start instruction unit has output the automatic maneuvering start instruction, the watercraft control device starts the control of the automatic maneuvering mode in the order of the first control and the second control, and wherein, if the angle difference is less than or equal to the threshold value when the automatic maneuvering start instruction unit has output the automatic maneuvering start instruction, the watercraft control device starts the control of the automatic maneuvering mode according to the second control without executing the first control.

10. A watercraft control device provided in a watercraft including an actuator having a function of generating a propulsive force of the watercraft and a function of generating a turning moment in the watercraft, a watercraft location detection unit configured to detect a location of the watercraft, a heading detection unit configured to detect a heading of the watercraft and an operation unit configured to receive an input operation for operating the actuator, wherein the watercraft control device operates the actuator on the basis of at least the input operation received by the operation unit, wherein the watercraft control device has a manual maneuvering mode in which the actuator is operated on the basis of the input operation received by the operation unit; and an automatic maneuvering mode in which the actuator is operated without any need for the operation unit to receive the input operation, wherein the watercraft control device is switched to the automatic maneuvering mode when a request of the automatic maneuvering mode is received from a watercraft operator or an occupant when the communication device is carried by the watercraft operator or the occupant and the watercraft operator or the occupant is away from the watercraft, wherein, in the automatic maneuvering mode, the watercraft control device calculates a distance between the watercraft and the communication device and an angle difference between a heading angle of the watercraft and an azimuth angle of the communication device in the watercraft, based on the location of the watercraft detected by the watercraft location detection unit, the heading of the watercraft detected by the heading detection unit, and the location of the communication device detected by the communication device location detection unit when the request of the automatic maneuvering mode is received, the watercraft control device is able to execute a first control, a second control and a third control, without any need for the operation unit to receive the input operation based on the distance between the watercraft and the communication device and the angle difference between the heading angle of the watercraft and the azimuth angle of the communication device in the watercraft, calculated when the request of the automatic maneuvering mode is received, the first control is the control for causing the watercraft to turn in situ so that a bow of the watercraft is directed to the watercraft operator or the occupant who is away from the watercraft based on the angle difference between the heading angle of the watercraft and the azimuth angle of the communication device in the watercraft, or for causing the watercraft to turn so that the bow of the watercraft is directed to the watercraft operator or the occupant who is away from the watercraft with the watercraft moving toward the communication device, the second control is the control for causing the watercraft to move substantially straight toward the watercraft operator or the occupant who is away from the watercraft, with a return route on a straight line connecting the location of the watercraft and the location of the communication device, after the first control, and the third control is the control for controlling in which the rate of decrease in the distance between the watercraft and the communication device becomes zero when the distance between the watercraft and the communication device becomes less than or equal to a predetermined distance while the second control is being executed.

11. A watercraft control method of controlling a watercraft including an actuator having a function of generating a propulsive force of the watercraft and a function of generating a turning moment in the watercraft and an operation unit configured to receive an input operation for operating the actuator, the watercraft control method comprising:

a watercraft control operation of operating the actuator on the basis of at least the input operation received by the operation unit, detecting a location of the watercraft and a heading of the watercraft, and detecting a location of a communication device, wherein the watercraft control operation includes a manual maneuvering operation of operating the actuator on the basis of the input operation received by the operation unit; and an automatic maneuvering operation of operating the actuator without any need for the operation unit to receive the input operation, wherein a watercraft control device is switched to the automatic maneuvering operation when a request of the automatic maneuvering operation is received from a watercraft operator or an occupant when the communication device is carried by the watercraft operator or the occupant and the watercraft operator or the occupant is away from the watercraft, wherein, in the automatic maneuvering operation, the watercraft control device calculates a distance between the watercraft and the communication device and an angle difference between a heading angle of the watercraft and an azimuth angle of the communication device in the watercraft, based on the location of the watercraft, the heading of the watercraft, and the location of the communication device when the request of the automatic maneuvering mode is received, a first control, a second control and a third control can be executed without any need for the operation unit to receive the input operation based on the distance between the watercraft and the communication device and the angle difference between the heading angle of the watercraft and the azimuth angle of the communication device in the watercraft, calculated when the request of the automatic maneuvering operation is received, the first control is the control for causing the watercraft to turn in situ so that a bow of the watercraft is directed to the watercraft operator or the occupant who is away from the watercraft based on the angle difference between the heading angle of the watercraft and the azimuth angle of the communication device in the watercraft, or for causing the watercraft to turn so that the bow of the watercraft is directed to the watercraft operator or the occupant who is away from the watercraft with the watercraft moving toward the communication device, the second control is the control for causing the watercraft to move substantially straight toward the watercraft operator or the occupant who is away from the watercraft, with a return route on a straight line connecting the location of the watercraft and the location of the communication device, after the first control, and the third control is the control for controlling in which the rate of decrease in the distance between the watercraft and the communication device becomes zero when the distance between the watercraft and the communication device becomes less than or equal to a predetermined distance while the second control is being executed.

12. A non-transitory computer-readable storage medium storing a program for causing a computer, mounted in a watercraft including an actuator having a function of generating a propulsive force of the watercraft and a function of generating a turning moment in the watercraft, an operation unit configured to receive an input operation for operating the actuator, and a trigger generation unit configured to generate a trigger, to execute:

a watercraft control operation of operating the actuator on the basis of at least the input operation received by the operation unit, detecting a location of the watercraft and a heading of the watercraft, and detecting a location of a communication device, wherein the watercraft control operation includes a manual maneuvering operation of operating the actuator on the basis of the input operation received by the operation unit; and an automatic maneuvering operation of operating the actuator without any need for the operation unit to receive the input operation, wherein a watercraft control device is switched to the automatic maneuvering operation when a request of the automatic maneuvering operation is received from a watercraft operator or an occupant when the communication device is carried by the watercraft operator or the occupant and the watercraft operator or the occupant is away from the watercraft, wherein, in the automatic maneuvering operation, the watercraft control device calculates a distance between the watercraft and the communication device and an angle difference between a heading angle of the watercraft and an azimuth angle of the communication device in the watercraft, based on the location of the watercraft, the heading of the watercraft, and the location of the communication device when the request of the automatic maneuvering mode is received, a first control, a second control and a third control can be executed without any need for the operation unit to receive the input operation based on the distance between the watercraft and the communication device and the angle difference between the heading angle of the watercraft and the azimuth angle of the communication device in the watercraft, calculated when the request of the automatic maneuvering operation is received, the first control is the control for causing the watercraft to turn in situ so that a bow of the watercraft is directed to the watercraft operator or the occupant who is away from the watercraft based on the angle difference between the heading angle of the watercraft and the azimuth angle of the communication device in the watercraft, or for causing the watercraft to turn so that the bow of the watercraft is directed to the watercraft operator or the occupant who is away from the watercraft with the watercraft moving toward the communication device, the second control is the control for causing the watercraft to move substantially straight toward the watercraft operator or the occupant who is away from the watercraft, with a return route on a straight line connecting the location of the watercraft and the location of the communication device, after the first control, and the third control is the control for controlling in which the rate of decrease in the distance between the watercraft and the communication device becomes zero when the distance between the watercraft and the communication device becomes less than or equal to a predetermined distance while the second control is being executed.

\* \* \* \* \*